United States Patent [19]

Leger

[11] Patent Number: 4,927,994

[45] Date of Patent: May 22, 1990

[54] MODULAR RESISTANCE HEATER ASSEMBLY

[75] Inventor: Kenneth B. Leger, Centerville, Ohio

[73] Assignee: The United States of America as represented by the Secretary of the Air Force, Washington, D.C.

[21] Appl. No.: 318,030

[22] Filed: Feb. 28, 1989

[51] Int. Cl.$^5$ .......................... H05B 3/08; H05B 3/14
[52] U.S. Cl. ..................................... 219/343; 219/553
[58] Field of Search ............... 219/343, 345, 347, 350, 219/351, 353, 354, 355, 357, 542, 546, 552, 553; 373/117, 119, 128

[56] References Cited

U.S. PATENT DOCUMENTS

| 1,721,099 | 7/1929 | Wiegand | 219/357 |
|---|---|---|---|
| 3,328,558 | 6/1967 | Rall et al. | 219/354 |
| 3,351,742 | 11/1967 | Harris | 219/552 |
| 3,573,429 | 4/1971 | Brodbeck et al. | 219/343 |
| 3,705,253 | 12/1972 | Hicks | 219/355 |
| 3,737,553 | 6/1973 | Kreider et al. | 219/343 |
| 4,755,658 | 7/1988 | Wilsey | 219/541 |

FOREIGN PATENT DOCUMENTS 1069194  1/1984  U.S.S.R. .............. 219/553

Primary Examiner—A. D. Pellinen
Assistant Examiner—Geoffrey S. Evans
Attorney, Agent, or Firm—Gerald B. Hollins; Donald J. Singer

[57] ABSTRACT

A high-temperature electrical resistance heating module which employs a graphite or equivalent material electrical resistance element in an arrangement providing for pressurized fluid cooling of the heater support headers, and additionally provides a reradiating reflector assembly. The module includes resistance element thermal expansion accommodation through the use of a high-temperature simple expansion support member located in close proximity to the heater resistance element where binding and distortion forces are minimized. The disclosed heater module can be used in any physical orientation in a nonoxidizing atmosphere such as nitrogen or vacuum and can achieve operating temperatures in the range of 4500° F. Energy dissipation densities in the range of 350 BTU per square foot second and operating energy dissipation in the range of 140 kilowatts are achieved. A typical use of the heater in laboratory testing of high-temperature transatmospheric aircraft components is disclosed.

20 Claims, 5 Drawing Sheets

MODULAR RESISTANCE HEATER ASSEMBLY

RIGHT OF THE GOVERNMENT

The invention described herein may be manufactured and used by or for the Government of the United States for all governmental purposes without the payment of any royalty.

BACKGROUND OF THE INVENTION

This invention relates to the field of small sized electrical resistance heater apparatus of the high radiant energy generating and high operating temperature type—heaters operating in the range of 100 to 200 kilowatts of input power.

As presently envisioned, the military aircraft of the future will include a combination of atmospheric flight capability and above-atmosphere or space flight capability. Inherent in such vehicles is the incurrence of repeated transitions between space and atmospheric flight conditions—transitions which must occur upon exit or reentry of the vehicle into the earth's atmosphere. In presently used rocket-propelled space vehicles it has become common practice to employ high-temperature ceramic or tile materials or other thermal protecting arrangements that are disposed over salient and atmospheric heating prone portions of the flight vehicle for withstanding the high-temperature transition of space to atmospheric flight. In the case of a transatmospheric aircraft, however, it is necessary that wing surfaces and other unshielded portions of the aircraft be capable of withstanding this transition heating without the use of heavy and silhouette complicating additional structures. For such vehicles, the use of carbon-carbon composite materials and actively cooled structures are undergoing intense investigation. This investigation includes testing that simulates conditions expected during vehicle contact with the atmosphere at speeds of Mach 25.

This investigation therefore includes the laboratory testing of vehicle related structures at temperatures in the 3000°–4500° F. range.

In addition to these aircraft-spacecraft vehicle testing needs, there is a presently well-developed effort attempting to improve the heat resistance characteristics of artillery and rocket nose cone components—components which also involve the use of such arrangements as carbon and laminated carbon structures. In the testing of a nose cone tip portion for erosion characteristics, for example, it is desirable to subject the nose cone to both elevated temperatures and other hostile environment conditions in order to assess its accuracy retaining capabilities.

In addition to all of these flight vehicle related activities, there is an ongoing need for high-temperature generating apparatus in a plurality of industrial and commercial arts that are historic and evolving in nature. Included in these activities is fabrication and testing of the ceramic materials used in glass and steel melting furnaces and in the fabrication of high-temperature industrial apparatus such as the ceramic insulators and heaters used in generating high-temperature environments.

The use of electrical resistance heating provides a number of significant advantages in each of these high-temperature environments, advantages which overshadow the limited choice of resistance materials capable of operating at such temperatures. Previous resistance heating test apparatuses have included the use of metallic elements and glass or quartz enclosed heating sources, i.e., high-temperature quartz lamps, and also the use of graphite inclusive heating elements in a variety of configurations. In practice however, it is found that metallic elemented, quartz enclosed heaters are limited in temperature generation and heat flux rates to values in the range of 2700° F. and 140 BTU per square foot second. Contemplated test needs in the transatmospheric vehicle field, however, include temperatures in excess of 4,000° F. and heat flux rates exceeding 300 BTU per square foot second. Clearly such quantities are beyond the capability of the quartz enclosed metallic filament heat source.

The heater disclosed in U.S. Pat. No. 3,573,429 of F. W. Brodbeck et al is an example of a graphite element based heating apparatus that is capable of operating in the temperature and heat flux ranges needed for transatmospheric vehicle testing. Graphite heating elements are in fact capable of producing heat flux densities in the range of 400 BTU square foot second.

The heater described in the Brodbeck patent, notwithstanding these underlying capabilities, however, has been found to be limited by a number of practical considerations, considerations which include high initial and operating costs, unpredictable physical integrity—particularly when operated in inverted positions, inability to maintain satisfactory electrical connections, difficulty in establishing and maintaining cooling system closure, and thermal-physical stress induced short operating life.

Other examples of graphite heating apparatuses are to be found in the patents of D. M. Harris, U.S. Pat. No. 3,351,742, and H. G. Wilsey, U.S. Pat. No. 3,755,658. The Harris patent is concerned with a graphite heating element in which the cross-sectional area is varied throughout the element length in order to maintain a desirable element temperature profile. This desired cross-sectional variation is illustrated to be achieved in a plurality of manners in the Harris invention and is used in order that the temperature uniformity requirements of an integrated circuit and epitaxial deposition furnace be met. It is also notable that the energy densities and operating temperatures recited in the Harris patent are significantly below those of the present invention.

In the Wilsey patent is disclosed a graphite heater which has a circular or cylindrical configuration and a heat generating path that is defined by a plurality of alternating upward and downward facing zig-zag picket members. A plurality of circumferential slot cuts serve to for the zig-zag picket members comprising the Wilsey heating element. The Wilsey apparatus is especially suited for use in crystal growing furnaces and similar lower temperature apparatus. The use of graphite screws for joining the heating element to a graphite power connector element is a notable aspect of the Wilsey heater.

As indicated by these patent examples, numerous arrangements of graphite elements are known in the heating art. Notwithstanding these examples however, there has been a notable lack of an operationally satisfactory low-cost graphite heater that is capable of generating large value heat flux in the 4500° F. or 2500° C. range of temperatures with practical convenience.

SUMMARY OF THE INVENTION

In the present invention a modular electrical resistance heater capable of operation in the range of 140 kilowatts of electrical energy input while permitting 4500° F. temperatures is provided. The heater employs an elongated U-shaped graphite resistance element that is mounted to a pair of water-cooled header elements at one heater end and provided with a single degree of freedom expansion and contraction movement accommodation at the distal heater end. The expansion and contraction movement is accomplished by a high-temperature slip joint apparatus which acts in one coordinate axis direction and maintains captivity in the other two axis directions. The heater is provided with a reflector of the reradiating type which is also arranged for water cooling. Cooling water flow between a pedestal-manifold portion of the reradiating element and the heater supporting header members is accomplished with high-temperature flexible tubing disposed in a reliable and easily fabricated axially linear configuration. The flexible tubing is provided with heat shielding from the heater radiant energy by a second function of the water-cooled reradiating element—a shielding function. Support of the heating element in any operational disposition is provided by threaded engagement between the heater element and the electrical energy supplying headers and this threaded engagement is supplemented by graphite cement interfaces in the heater to electrical energy supply connection path. The heater module is intended for operation in a vacuum or inert gas atmosphere such as nitrogen gas.

It is an object of the present invention therefore to provide an electrical resistance heater module that is capable of operating in the 4500° F., 140 kilowatt electrical energy input and 300-400 BTU per square foot second radiant energy flux realm.

It is another object of the invention to provide an electrical resistance heater of this variety that is also relativity long-lived and free of frequent maintenance requirements in operation.

It is another object of the invention to provide an electrical resistance heater that may be operated in any physical orientation including horizontal, vertical, or inverted orientation.

It is another object of the invention to provide an electrical resistance heater element of this type which is easily and conveniently fabricated.

It is another object of the invention to provide an electrical resistance heater element cooling fluid distribution wherein the cooling fluid apparatus is protected from radiant energy abuse.

It is another object of the invention to provide a high energy electrical heater module in which the necessary thermal expansion accommodation of the heating resistance element is accomplished without flexing of the cooling fluid distribution system components.

It is another object of the invention to provide a modular electrical resistance heater assembly which ma be combined with a plurality of similar assemblies for generating a large area source of high temperature, high intensity radiant energy flux.

It is another object of the invention to provide an electrical resistance heater arrangement in which the maintenance of physical and electrical integrity in the resistance element and the supporting and connecting elements is enhanced by the use of a cemented fabrication arrangement.

It is another object of the invention to provide an electrical resistance high-temperature heating element arrangement in which thermal length expansion movement of the heating element is accommodated in a reliable and low-cost manner.

It is another object of the invention to provide an electrical resistance high-temperature heating element arrangement in which thermal length expansion movement of the heating element is accommodated by a small-sized high operating temperature expansion apparatus also having a single degree of freedom characterization.

It is another object of the invention to provide a high temperature electrical resistance heater arrangement which achieves improved operating efficiency through the use of heat reradiation—reradiation that eliminates the effects of possible contaminating materials that would tend to condense on an actively cooled reflecting surface.

It is another object of the invention to provide a high-temperature electrical resistance heater module in which the heating element is arranged in an uncomplicated and simple physical configuration.

Additional objects and features of the invention will be understood from the following description and the accompanying drawings.

These and other objects of the invention are achieved by a modular electrical resistance heater apparatus which includes the combination of an elongated U-shaped uniplanar electrically conducting heater element having first and second parallel disposed uniformly cross-sectioned U leg heating members which are joined by an integral coplanar crossover portion located at one U leg member's end, the heater element, including first and second cantilever support and electrode attachment regions located at the crossover distal end of each U leg heating member; an expansion accommodating support member disposed at the crossover portion adjacent end of the heater element, the support member including means enabling thermally-induced movement of the heater element crossover portion along a first axis longitudinal of the U leg heating members, together with captive retention of the crossover portion along the second and third axis orthogonal of the first axis; first and second fixedly mounted, electrically segregated electrical header elements disposed adjacent the heater element support and electrode attachment regions; first and second electrically conductive electrode elements disposed in threaded physical and electrical connection between respective ones of the electrical header elements and the heater element electrode attachment regions; electrically conductive means connected respectively between each of the first and second header element and oppositely polarized terminals of a heater energizing controllable source of electrical energy, cooling means for controlling the operating temperature of the header elements in the presence of heat energy attending heater element operation.

DETAILED DESCRIPTION

Figure 1:
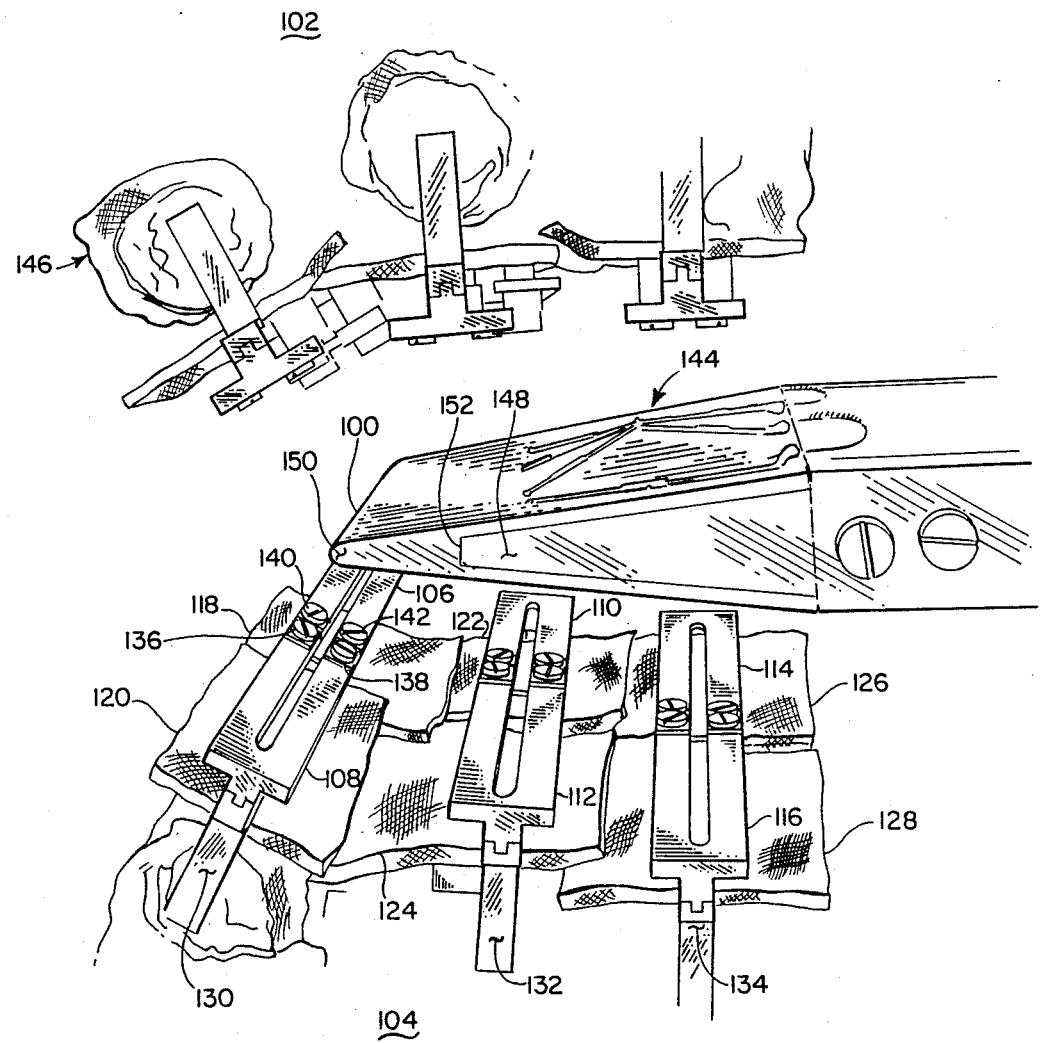
FIG. 1 is an overall perspective view showing resistance heater modules according to the invention used in testing an aircraft graphite leading edge structure.

FIG. 1 in the drawings shows an array of electrical resistance heating element modules disposed surrounding a sample 100, of a graphite generic hypersonic wing leading edge structure in a test chamber. The wing sample 100 includes a tapered leading edge portion 150 which is received over a supporting substrate member 148 and interfaces with this supporting substrate 148 along an interface line 152. The leading edge sample 100 is shown to be provided with an array of temperature measuring elements 144, which may be in the nature of bimetallic thermocouples or similar devices. The leading edge sample 100 is supported from a mounting mechanism which is not shown in FIG. 1.

Surrounding the leading edge structure 100 in FIG. 1 are upper and lower arrays of modular heating elements 102 and 104 which provide high intensity thermal flux that is appropriate for the intended thermal testing. Notable portions of lower array 104 modular heating elements include the heat generating resistance elements 106, 108, 110, 112, 114, and 116, the resistance element mounting and electrical connecting screws 136, 138, 140, and 142, and the resistance element support members 130, 132, and 134. Also shown in the FIG. 1 testing arrangement are a plurality of reradiating elements 118, 120, 122, 124, 126, and 128 which serve to capture and secondarily radiate to the sample 100 the radiant energy originating at the lower face and sides of the resistance elements 106, 108, 110, 112, 114, and 116. Additionally shown in FIG. 1 are representative samples 146 of a cloth-like thermal insulating material such as the material known as Q-Felt, which is supplied by Manville Corporation of Waterlet, Ohio, which may be disposed around portions of the heater elements to protect thermally sensitive components from radiation and convection transmitted heat.

Figure 2:
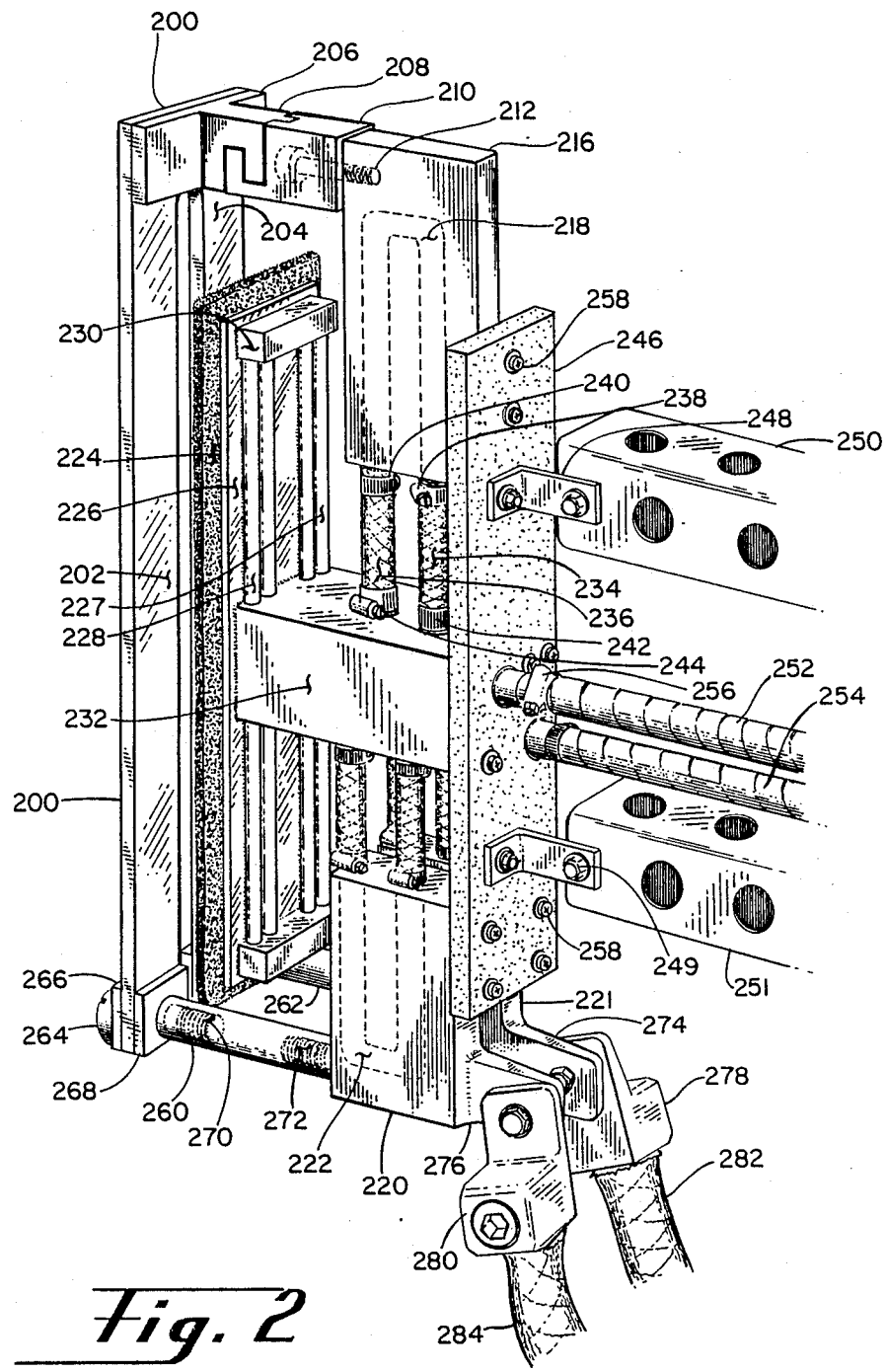
FIG. 2 is a back side perspective view of one heating element module from FIG. 1.

FIG. 2 in the drawings shows a rearward perspective view of one modular heating element from the arrays 102 and 104 in FIG. 1. In the FIG. 2 drawing the legs of the heat generating resistance element 200 are indicated at 202 and 204. As is indicated in each of FIGS. 1-3, the legs 202 and 204 are preferably disposed in the form of an elongated and inverted capital letter U with the electrical energy terminals for leg heating being located at the open or lower end of the U legs.

At the closed or upper end of the heater element U legs in FIG. 2 is located an expansion accommodating support having the two portions 208 and 210 which cooperate to enable a limited movement of the resistance element 200 upper end portion. This upward and downward direction movement of the element closed end is enabled while movement restraint in the other two coordinate axes directions is accomplished. Such restraint is in the directions of "in" and "out" and to the left and right in the FIG. 2 drawing. As shown by the representation of the support portions 208 and 210 in FIG. 2, these portions mate by way of an interlocking tongue and groove arrangement in order to provide this limited movement freedom.

Figure 5:
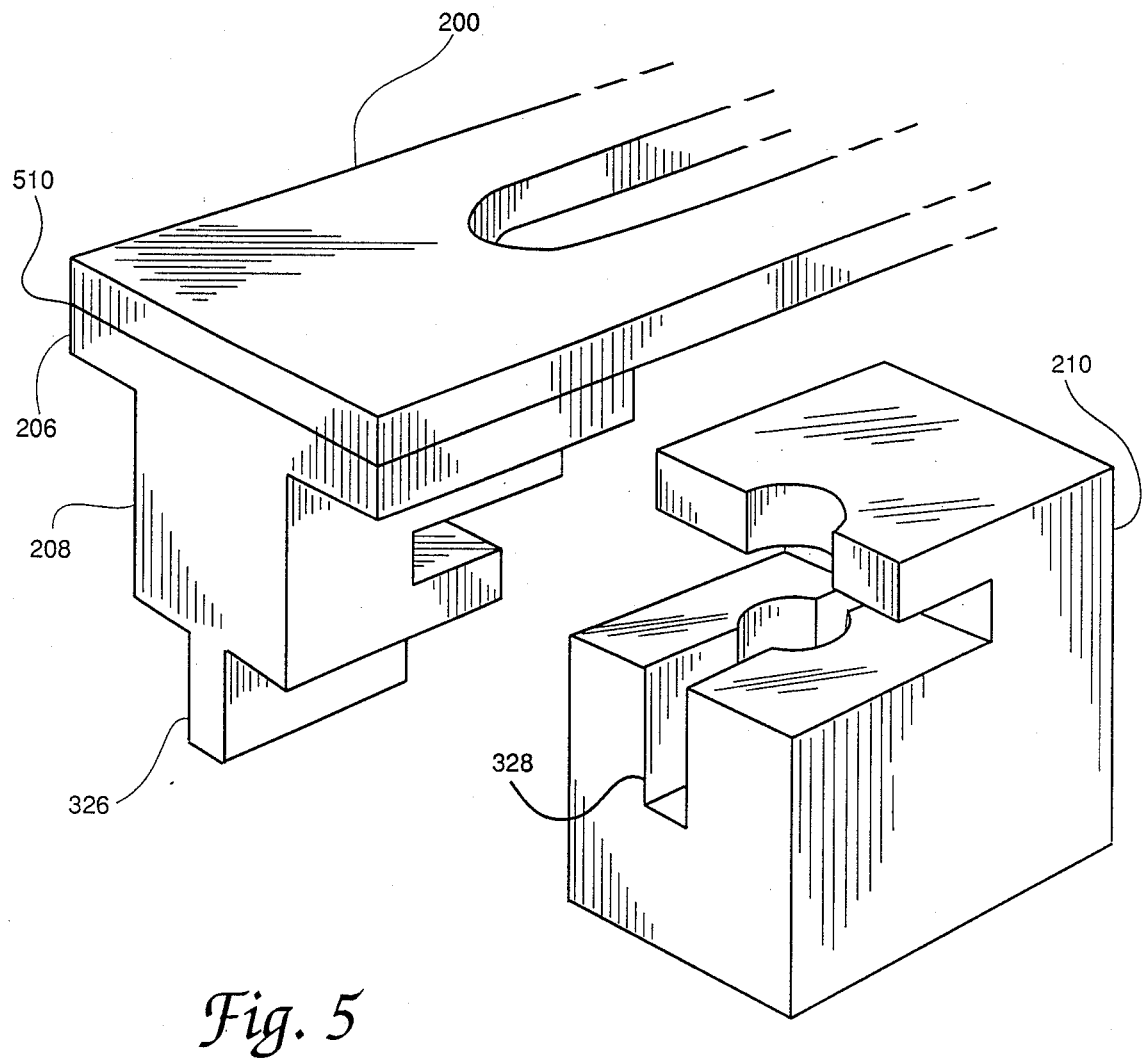
FIG. 5 shows details of the resistance element free end support in FIGS. 2 and 3.

The lower or header 216 adjacent most support portion 210 is attached to the header 216 by way of a graphite machine screw 212. As shown in FIG. 5 of the drawings, the graphite machine screw head is accessible prior to engagement of the support portion 208.

At the lower end of the FIG. 2 resistance element 200 are located a pair of electrode or power rod members 260 and 262 by which a flow of electrical current is conveyed to the resistance element 200 and also by which the lower end of the resistance element is supported in a position of separation from the electrical header members 220 and 221. As is indicated at 270 and 272, the electrode or power rod members 260 and 262 are preferably attached to the resistance element 200 and the header member 220 by way of threaded attachment. Additionally, the threads of a machine screw component of this attachment, a screw which is preferably made of graphite or similar high-temperature electrically conductive material, are indicated at 270 in FIG. 2. The screw head associated with the body threads 270 is indicated at 264. The threads of a metallic stud member which is connected to the header member 220 are indicated at 272 in FIG. 2. The thread indications at 270 and 272 of course represent both the male and mating female threads of the respective elements and may be of the ½-13 N.C. thread type or equivalent.

The interface of male and female threads in the electrode or power rod members 260 and 262 is preferably arranged to be physically tight and of a low electrical resistance value through the use of a graphite cement interface layer that is applied during assembly of the FIG. 2 apparatus. A graphite cement such as the DYLON ® cement of grade G.C. manufactured by Dylon Industries Incorporated of Berea, Ohio 44017, is preferred for this purpose. The DYLON ® cement includes a phenolic resin furfuryl alcohol, graphite, and formaldehyde ingredients; other cements made by other manufacturers or other high temperature electrically conductive materials may be alternately used in this thread mating. The name "DYLON" is a registered trademark of Dylon Industries, Incorporated.

Electrical energy is supplied to the FIG. 2 heater resistance element 200 by way of the flexible electrical cable or tether members 282 and 284, the cable terminating lug members 278 and 280, and the header members 220 and 221 which also include the lug attachment portions 274 and 276. Since the resistance elements 200 operates with electrical input that is in the range of 115 Volts and 1200 amperes in achieving the 140 kilowatt of operating range, the electrical cables 282 and 284 and lugs 278 and 280 are of a larger physical size.

A desirable arrangement for conveying electrical currents of this magnitude into the resistance element 200 is represented by the combination of the electrode or power rod 260, the machine screw with head 264 and the two square washers 266 and 268 shown in FIG. 2. Preferably the square washers 266 and 268 are cemented to the graphite surface of the resistance element 200 using the above-described DYLON ® graphite cement with the central holes of the washers being aligned with a similar sized hole in the heater element 200. With the application of torque in the range of 10 inch pounds to the graphite machine screw head 264 and additionally with the DYLON ® cement applied to the threads 270, it is found that the connecting electrical resistance is desirably low with respect to the nominal 0.09 ohm of resistance expected in heating element 200.

The DYLON ® graphite cement is also used in fabricating an attachment between the flat head region 206 of the support portion 208 and the resistance element i.e., at the interface 510 shown in FIG. 5. The bonding of the two components provides reinforcement to flat head region 206, providing the mechanical strength required to endure the high thermal stresses present in the heater element radius.

The leading edge structure 100 or other workpieces to be exposed to the heat of the FIG. 2 module will be located to the left of the resistance element 200, that is in front of the heater module. Energy originating in the tack side or right-hand side of the resistance element 200 will therefore be lost with respect to the workpiece without the use of an energy reflection arrangement to convey this back side energy once again to the workpiece or back into the resistance element 200. Although a conventional reflector device made of appropriately selected materials could be used advantageously for this purpose in the FIG. 2 heater module, it is found that absorbing and reradiating this back side energy from an appropriate high-temperature surface is a more practical arrangement.

In particular, since some of the material vaporized during operation of the FIG. 2 heater and materials resident in the workpiece 100 and in other nearby elements of a tested component tend to deposit on a conventional reflector, reradiation makes a more practical arrangement for back side energy capture. A layer of reradiating material is indicated therefore at 224 in FIG. 2, this layer may be comprised of a graphite felt material such as the felt manufactured by Polycarbon Inc., 28176 N. Avenue Stanford, Valencia, Calif. 91355 and identified as LD-G. Materials of this nature are capable of operating at the 4,500+ degree Fahrenheit temperatures desired of the FIG. 2 heater.

The reradiating graphite felt material 224 is preferably mounted on a cooled metal carrier member 226 and supported from a combination pedestal and manifold member which is indicated at 232 in FIG. 2.

In view of the combination of the achieved heater radiant energy level, the non-zero electrical losses to be expected in coupling the heater element 200 to the cables 282 and 284, and the heat conduction to be expected in the heater supporting structure it is found desirable to provide pressurized fluid cooling for members of the FIG. 2 apparatus that are closely associated with the resistance element 200. Such pressurized fluid cooling is therefore preferably provided for each of the electrical header elements 220 and 221, the support header 216 and the pedestal-manifold member 232 in FIG. 2. In the FIG. 2 module arrangement therefore, a supply of pressurized fluid is carried to and away from the heater assembly by the flexible tubing members 252 and 254 which connect to the pedestal and manifold member 232 by way of the hose barbs which are received in the pedestal and manifold member 232 and compression clamps 256.

The pressurized cooling fluid used in the FIG. 2 module is preferably water that is demineralized, deionized, and treated with 2 lbs. of trisodium phosphate per 1000 gallon in solution. The trisodium phosphate additive is found to reduce chemical reaction between deionized water and copper. This cooling fluid is subsequently coupled to the support header 216 by way of flexible tubing members 234 and 236 which also connect to hose barb fittings located on the pedestal and manifold member 232. Cooling fluid coupling also involves the support header 216, and the flexible tubing sealing compression screw clamps indicated at 238 240, 242, and 244 preferably the flexible tubing members 234 and 236 are made of high-temperature reinforced silicon tubing such as the SIL 030 tubing manufactured by New Age Industries, 2300 Maryland, Willow Grove, Pa. 19090. As is suggested by the braided appearance of this tubing in the FIG. 2 module the silicon tubing is preferably covered with a protective layer of ceramic braid.

The pressurized cooling fluid is also coupled to each of the header members 220 and 221 in the FIG. 2 heater assembly by way of the illustrated flexible tubing couplings—couplings which communicate with the pedestal and manifold member 232. As illustrated by the path 222, the fluid circuit in the header 220 is also circular in nature. As will be apparent in the FIG. 4 description of the header and manifold member 232, the coolant circuit in the headers 216, 220, and 221 are preferably disposed in a parallel circuit arrangement with respect to flow from the tubing members 252 and 254. By maintaining appropriately sized parallel flow rates in the headers 216, 220, and 221, uniform operating temperatures can be maintained in the headers. These temperatures are more uniform than would be the case with serial flows coolant in these members. In addition to the flow paths 218 and 222, the header member pressurized cooling fluid is also supplied to the coolant paths of the reradiating material metal carrier member 226, the paths indicated representatively at 227 and 228 in FIG. 2. The paths 227 and 228 are end coupled by way of a carrier member header which is indicated at 230 in FIG. 2.

According to one aspect of the invention, the pedestal and manifold member 232 serves a combined purpose in the FIG. 2 apparatus. This combination includes physically supporting the reradiating element 226 and also serving as a distribution manifold for the parallel fluid flows that maintain desirable operating temperatures in the heat exposed components. Information regarding the coolant path diameters and flow rates appropriate for the FIG. 2 apparatus is provided in connection with FIG. 4 below.

The pedestal-manifold member 232 and the headers 216, 220, and 221 in the FIG. 2 heater apparat s are physically supported from an electrically insulating substrate member 246 by way of an array of machine screws which are typically indicated at 258 in FIG. 2. The substrate member 246 is preferably made of a material such as "GLASTHERM TM " fiberglass reinforced, mineral filled and thermosetting resin bonded sheet manufactured by the Glastic Company located in Cleveland. Ohio. Details of the preferred grade "GLASTHERM TM " material are provided in the technical bulletin identified with the code letters 831-GT-TB. Preferably a GLASTHERM sheeting of 0.375 inch thickness is used at 246 in FIG. 2. In the FIG. 2 arrangement of the heater module a GLASTHERM material substrate member 246 is supported by the brackets 248 and 249 from a pair of punched metal supporting arms 250 and 251. The arms 250 and 251, and the brackets 248 and 249, may of course be replaced with other mounting arrangements as is convenient for using the heater of FIG. 2.

Several aspects of the FIG. 2 heater module are notable with respect to providing desirable heater assembly or heater usage attributes. Included in these aspects are the straight and axially aligned configuration of the flexible tubing members 234 and 236 in comparison with the curved and non-straight alignment of such coolant passages provided in the above referred-to apparatus of Brodbeck, the apparatus shown in U.S. Pat. No. 3,573,429. Both the use of straight alignment of the flexible tubing members and their immovable and fixed position nature in the FIG. 2 heater module adds to the operating life of these tubes in comparison with those of the Brodbeck apparatus. Experience with apparatus made according to the Brodbeck patent has in addition demonstrated that coolant tubing failure is a significant operating burden in this apparatus. The effects of a coolant failure can indeed be disastrous if failure occurs during high temperature operation of the heater and in the presence of an expensive and limited availability test specimen. The consequences of introducing unconfined liquid water to the presence of 4,000° F. operating temperature components can be understood to be somewhat violent in nature.

Another desirable aspect of the FIG. 2 heater module can be appreciated from realizing that the flexible tube members 234 and 236, and their similar tubing members connected to the headers 220 and 221, are disposed in the cool shadow of the metal carrier member 226 with respect to the high-temperature, high-radiation flux environment surrounding the resistance element 200. This cool shadow location of course, enables the use of more convenient and lower cost materials in fabricating the tubing members 234 and 236 and adds to the life of the tubing members.

Another desirable aspect of the FIG. 2 heater module resides in its maximum use of low-temperature conventional materials for fabricating the headers 216, 220, and 221 and the pedestal manifold 232. Preferably these elements are fabricated from copper such as the oxygen-free copper identified by the code name ASTM F68-68 Hard. Such conventional low-temperature and electrically desirable material as copper can be used in this location because of the pressurized fluid cooling system employed and as a result of the above described arrangement for achieving secure heater resistance element electrical connection and physical support.

Another desirable aspect of the FIG. 2 heater module therefore resides in use of the graphite electrode or power rod members 260 and 262 for making a final high temperature electrical connection to the resistance element 200. Notably, by way of these graphite electrode, members the use of metallic and temperature sensitive components adjacent the hot heater resistance element is avoided.

The presence of the graphite rods or electrodes 260 and 262 in the FIG. 2 heater also serves to decrease heat energy losses through conduction to the headers 220 and 221 in comparison with the direct or metallic connection between heater and header as is accomplished, for example, in the Brodbeck apparatus.

Use of the threaded machine screw attachment of resistance element 200 to the electrode members 260 and 262 is also a notable aspect of the FIG. 2 heater module and is a significant improvement over the tapered fit connection to the heating resistance element used in the Brodbeck heater. The tapered fit arrangement has been found susceptible to high-temperature degradation, poor electrical connections, and insecure mounting of the heating element. By way of the electrode or power rod and threaded engagements of the present invention therefore, both a low resistance electrical connection with the heater element and assured physical support or the heater element mass are achieved.

The electrical circuit involved in energizing the resistance element 200 commences with one of the cables 282 and 284 for example, the cable 282, and then proceeds through the lug 278, the lug attachment 274, the electrical header member 221, the electrode or power rod member 262 the graphite machine screw (shown at 302 in FIG. 3), the resistance element leg 204, the combination of resistance element crossover or leg intermediate portion paralleled with the support portion 206, the leg member 202, the graphite machine screw 264, the electrode or power rod member 260, the header 220, the lug attachment portion 276, the lug 280, and the cable 284.

In this electrical circuit it is notable that the header 216 is electrically floating or is actually at some electrical potential halfway between that of the lugs 278 and 280. The header 216 does not, however, participate in the current flow path of resistance element heating. The floating nature of the header 216 is also enabled by the electrical insulating properties of the substrate member 246 and the flexible tubing members 234 and 236. The pressurized cooling fluid supplied by the flexible tubing members 252, 254 234 and 236 may in reality conduct some current when the contemplated 100–125 volts energizing potential is applied to the lugs 278 and 280, however, the magnitude of this current is insignificant with respect to the 1200 amperes of current flowing in the legs 202 and 204. The electrical insulating nature of the preferred GlasTherm material in the substrate member 246 also allows the electrical circuit of the resistance element 200 to be isolated from the support arms 250 and 251.

Figure 3:
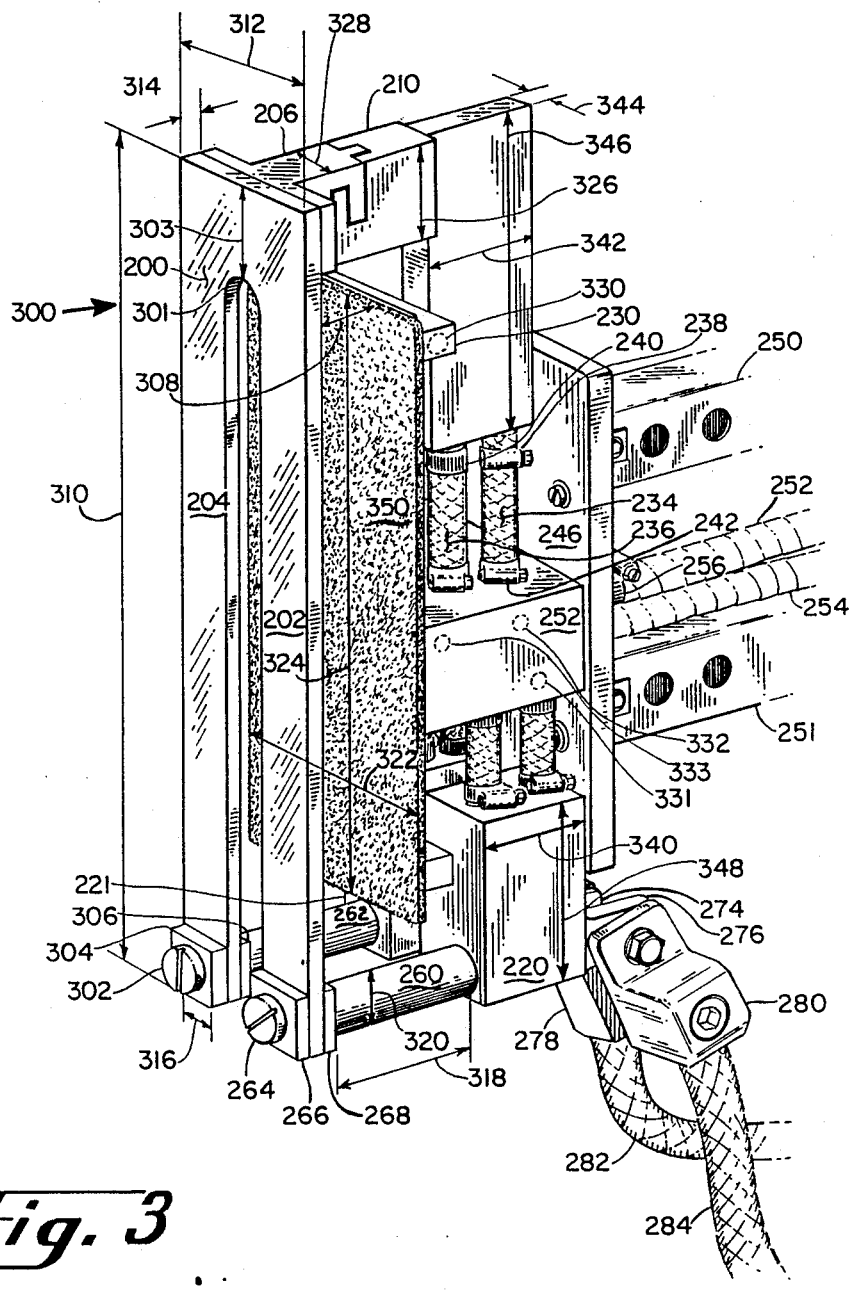
FIG. 3 is a frontal perspective view of the FIG. 2 module showing dimension and other construction details.

In the FIG. 3 frontal perspective view of the FIG. 2 heater module certain additional details are shown. Included in these additional details is the graphite machine screw head 302 and clearer views of its associated square washers 304 and 306 and also details of the crossover regions 300 of the resistance element 200. As illustrated in FIG. 3, this crossover region 300 includes a rounded or radius portion 301 and a lateral dimension 303 approximately equal to that of the leg elements 202 and 204

As may be discerned from the numbering used in FIG. 3 and from references made in the preceding discussions, the identifying numbers used in FIG. 3 are the same as the numbers used in FIG. 2 whenever possible—that is, the same part has the same numbering in both FIGS. 2 and 3. Where parts not appearing in FIG. 2 are to be described in FIG. 3 numbers of the 300 numbering series are used.

A principal part of the information first appearing in FIG. 3 is concerned with dimensions for one embodiment of the heater module. These dimension are shown with doubled arrow dimensioning lines and extension lines in some locations of the FIG. 3 drawing. Included in these dimensions are the overall length and width 310 and 312 of the resistance element, 200 these dimensions being 12.000 inches and 2.125 inches respectively, for the above referred-to 140 kilowatt embodiment of the invention. In this embodiment the resistance element 200 may have a thickness dimension, as indicated at 3141 of 0.125 inch; an individual leg width dimension, indicated at 316, of 0.875 inch; and a reradiate surface 350 to resistance element 200 separation 308 of 0.625 inches. Preferably the resistance element 200 is fabricated from heater grade graphite using appropriate machining operations. Graphite of this type is available from Airco Carbon Inc., St. Marysville. Pa. Grade as #3499.

The curved portion of the resistance element crossover region 300, that is the radius 301, is preferably made to have a radius length of 0.187 inch with the center point of the radius being located 1.062 inch from the upper end of the resistance element in FIG. 3. The electrode or power rod members 260 and 262 are also fabricated from heater grade graphite and preferably have an overall length, indicated at 318, of 1.687 inches and a diameter, indicated at 320, of 0.750 inch with the above mentioned ½-13 N.C. female thread being received in each end of the members 260 and 262. The reradiating surface 350 and the metal carrier member 226 may have an overall length dimension indicated at 324, of 9.062 inches; and a width dimension indicated at 322, of 2.5 inches. A wider reradiating surface 350 may be desired in some instances, as is illustrated in the FIG. 1 embodiment of the invention. The overall dimensions of the expansion accommodating support portion 208 and 210 are indicated at 326 and 328 in FIG. 3, these dimensions being 0.937 and 0.750 inch, respectively. Additional shape and interface details of the support portion 208 and 210 are shown in connection with FIG. 4. Details of the tongue and groove portions, 336 and 338, of the support portions 208 and 210 are also shown in FIG. 4.

Also shown in FIG. 3 are a number of plugged access holes used in fabricating the pressurized fluid cooled elements. These holes are the avenues by which internal passages of the cooled elements are formed. These drilled, counterbored, and plugged holes which are preferably permanently sealed by way of silver soldering—indicated at 330 for the carrier member header 230, and at 331, 332, and 333 for the manifold-pedestal member 232. Other formation arrangements for the pedestal manifold and the other cooled members may be used if desired. Such arrangements as casting or forming these members from integratable component elements are of course possible.

Overall height dimensions for the header members 216 and 220 are indicated at 340 and 342 in FIG. 3; these dimensions are 1.437 inch and 1.437 inch respectively in the described 140 kilowatt embodiment of the invention. Each of the header members 216 and 220 may have a length dimension as indicated at 346 and 348 which is 3.250 inches. The headers 220 and 221 are preferably 0.75 inches in thickness, and the header 215 is 0.5

Figure 4:
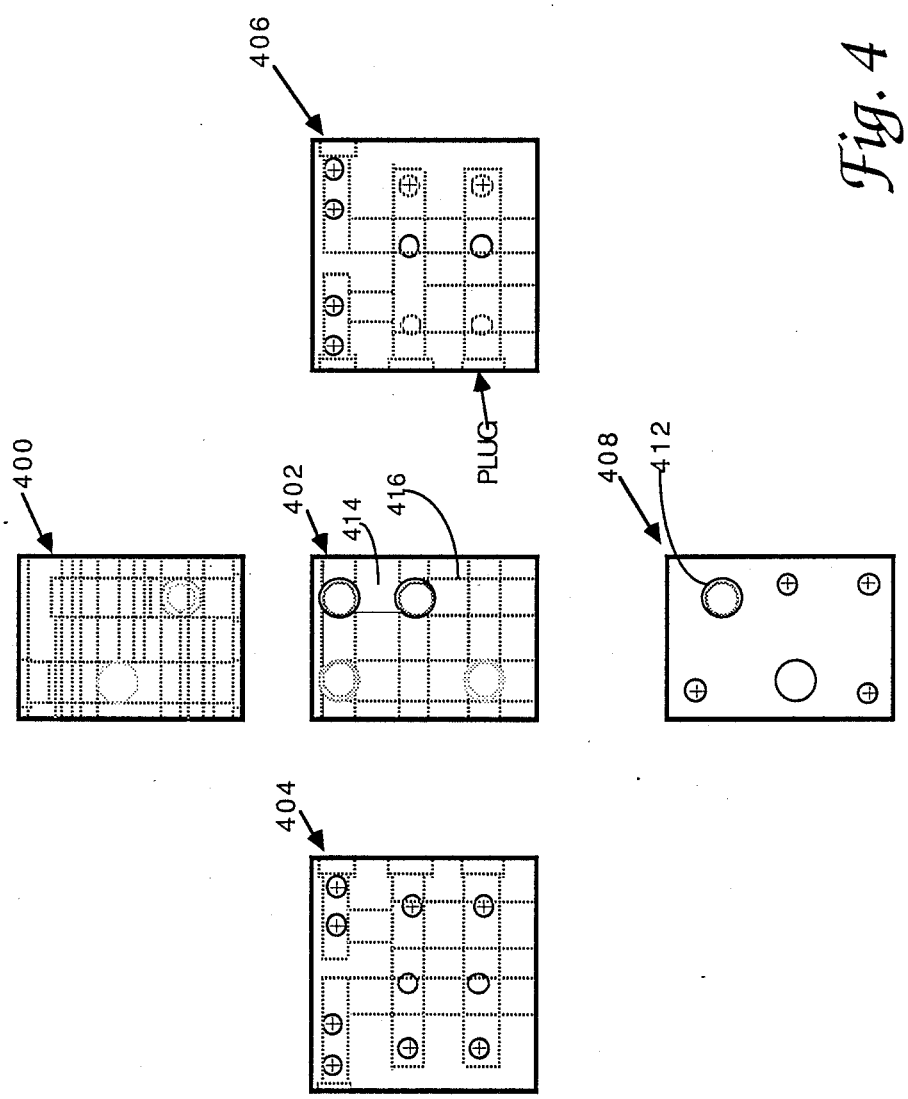
FIG. 4 shows five views of the reradiating element support pedestal of the FIG. 1-3 heater module.

FIG. 4 in the drawings, including the views 4A, 4B, 4C, 4D, and 4E shows dimensional and assembly details of the pedestal and manifold member 232 from FIGS. 2 and 3. The five views included in FIG. 4 are also identified by the numbers 400, 402, 404, 406, and 408 and are presumed to be arranged in accordance with the normal drafting practice wherein each next succeeding view is taken at 90 degrees with respect to he adjacent or previous view. According to this arrangement therefore, the view 402 shows the pedestal and manifold member surface that is in the foreground in FIG. 3 while the view 406 shows the upward oriented surface in FIG. 3.

In addition to the dimension and flow paths shown in FIG. 4, there is also shown at 410 a preferred sequence for machining the FIG. 4 pedestal and manifold member. Most of the steps recited in the sequence 410 are drilling operations with the identified drill bit size, however the steps 2 and 3 include a counterboring operation and step 12 includes a silver solder plugging of selected holes.

The manifold and pedestal member pressurized fluid ports are intended to accommodate a total fluid flow rate of 3 gal/min using a pressure of 65 PSI with the pressurized fluid entering the pedestal-manifold member by the way of the flexible tube 252 and parting by way of the tube 254. As indicated at 412 in FIG. 4 the entering fluid encounters a counterbore restriction before reaching the coolant paths 227 and 228 of the metal carrier member 226. This restriction serves to achieve the desired limited flows in the paths 227 and 228 and also to assure adequate flow rates in the other manifold and pedestal member parts.

The hose barbs by which the flexible tubing members 234 and 236, for example, are connected to the pedestal manifold member 232 are preferably attached to the pressure manifold member body portion in FIG. 4 by way of 1500° F. silver soldering. Oxygen-free copper is a preferred material for both the hose barbs and the pedestal manifold member body portion. In view of this fabrication material excellent silver soldering flows are readily obtained.

FIG. 5 in the drawing shows details of the resistance element free end support including the support portions 208 and 210 and details of the tongue 326 and groove 328 appearing in these portions. Some of the more significant dimensions of the FIG. 5 are shown.

Use experience with the heater module described in the above referred to U.S. Pat. No. 3,573,429 of Brodbeck has shown that heating accomplished in this manner incurs a cost that is in the range of $18,000 per square foot of radiated test object surface area. Using a similar set of environmental conditions, the present heater is found to involve costs in the range of $1,600 per square foot of radiated surface The difference in these costs can be attributed to a number of considerations including the increased reliability of the presently described heater module, the simplified and less costly fabrication procedure for the present invention module, and to the reduced degree of difficulty involved in maintaining the heater of the present invention in an operating condition.

A principal aspect of the present heater advantage resides in the fixed position of the header members 216, and 220, and 221 with respect to the manifold member 232 since shorter and non-flexing lengths of coolant tubing are thereby enabled and the flexing of these tubing members by resistance element thermal expansion movements is eliminated. In essence therefore, the high-temperature expansion accommodation herein disclosed is found to be notably superior to the more massive low temperature expansion accommodating apparatus of the Brodbeck patent. The advantages of the described heater module also include the relatively simple and uncomplicated shape of the resistance element 200 in comparison with the complex serpentine shape used in the Brodbeck apparatus. An additional advantage of the present invention heater module includes the heater element attachment method, wherein threaded attachment allows for inverted module operation.

A number of variations or alternate arrangements of the invention are possible. Included in these possibilities are the use of materials other than the described graphite for resistance element fabrication, materials such as silicon carbide are for example, possible variants of the graphite, particularly where lower temperatures are to be attained with the heater module. Similarly, the sizes and shapes of the resistance element 200 can be varied to some extent within the purview of the invention. Materials such as brass or silver c n of course be substituted for the oxygen free copper that has been identified for use in the header and pedestal manifold and reradiating element metallic backing members of the heater module. Other possible variations of the invention include the use of different coolant fluids.

Although the graphite machine screws used in heating element mounting and electrical connection provide desirable thermal physical and electrical properties, the use of alternate materials such as carbon-carbon in these machine screws can be accomplished with acceptable performance.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Modular electrical resistance heating apparatus comprising the combination of:
    an elongated U-shaped uniplanar electrically conductive heater element having first and second parallel disposed, uniformly cross-sectioned U leg heating members which are joined together by an integral coplanar crossover portion located at one U leg member's end, said heater element including first and second cantilever support and electrode attachment regions located at the crossover distal end of each said U leg heating member;
    an expansion accommodating support member disposed at the crossover portion adjacent end of said heater element, said support member including means enabling thermally-induced movement of said heater element crossover portion along a first axis longitudinal of said U leg heating members together with captive retention of said crossover portion along the second and third axes orthogonal of said first axis;
    first and second fixedly mounted, electrically segregated electrical header elements disposed adjacent said heater element support and electrode attachment regions;
    first and second electrically conductive electrode elements disposed in threaded physical and electrical connection between respective ones of said electrical header elements and said heater element electrode attachment regions;
    electrically conductive means connected respectively between each said first and second header elements and oppositely polarized terminals of a heater energizing controllable source of electrical energy;
    cooling means for controlling the operating temperature of said heater apparatus in the presence of thermal energy attending energized operation of said heater members.

2. The heater apparatus of claim 1 further including a pedestal supported reradiating member disposed in a plane paralleling the plane of said uniplanar heater element, said reradiating element including a heater element adjacent surface thermally isolated from said support pedestal and energizable into an elevated temperature reradiating condition by a portion of the energy dissipated in said heater element.

3. The heater apparatus of claim 2 wherein said expansion accommodating support member comprises:
    a third fixedly mounted, electrically segregated header element disposed adjacent said heater element crossover portion;
    a first support portion connected to and movable with said heater element crossover portion; and
    a second support portion fixedly mounted on said third header element and movably engaged with said first support portion;
    whereby heater element thermal expansion generates relative movement between said first and second support portions.

4. The heater apparatus of claim 3 wherein said heater element is comprised of graphite.

5. The heater apparatus of claim 4 wherein said reradiating member includes a graphite fiber surface portion disposed facing said heater element and a metallic substrate member disposed intermediate said supporting pedestal and said graphite fiber surface portion.

6. The heater apparatus of claim 5 wherein said cooling means includes pressurized fluid conducting passages disposed within said first, second, and third header elements in said supporting pedestal, and in connection with said reradiating element metallic substrate member.

7. The heater apparatus of claim 6 wherein said expansion accommodating support member first support portion is integrally connected with said heater element crossover portion and wherein the cross sectional area of said combined crossover portion and support member first support portion is greater than the cross sectional area of each said U leg heater member of said heater element.

8. The heater apparatus of claim 7 wherein said cooling means includes a plurality of supporting pedestal pressure manifold passages and electrically insulating flexible tubing means for connecting said manifold passages with said header elements fluid conductive passages.

9. The heater apparatus of claim 8 wherein said expansion accommodating support member first and second support portions include tongue and groove interrelated engagement surfaces.

10. The heater apparatus of claim 9 wherein said cooling means includes a plurality of flexible tubing elements disposed in straight and direct alignment parallel with the U leg members of said heating element between said supporting pedestal and said header elements, and wherein said tubing elements also reside in fixed immovable residence within the cool shadow of said reradiating element metallic substrate member with respect to said heater element.

11. The heater apparatus of claim 10 wherein said supporting pedestal, said reradiating element metallic substrate member, and said header elements are comprised of copper and wherein said pressurized cooling fluid includes water as a component thereof.

12. The heater apparatus of claim 6 wherein said electrically conductive electrode elements are also comprised of graphite and wherein said threaded connections include mating male and female threads received on a post portion of each said first and second electrical header element and in end portions of said electrode elements and also include graphite machine screw members extending through said heater element electrode attachment regions into threaded opposite end portions of said electrode elements.

13. The heater apparatus of claim 12 wherein said threaded connections also include graphite washer members received in sandwich relationship with said heater element electrode attachment regions and layers of graphite cement received intermediate selected of said washer, heater element, and screw thread elements.

14. The heater apparatus of claim 13 wherein said electrically conductive means includes flexible electrically conductive tether means connecting between said first and second header elements and said heater energizing controllable source of electrical energy and further including a nonmetallic, electrically insulating, substrate member disposed connecting heater opposite portions of said pedestal and header elements.

15. The heater apparatus of claim 14 further including thermally insulating cloth shielding means disposed over selected portions of said heater apparatus including said flexible electrically conductive tether means for shielding said selected portions from thermal energy emitted by said heater and by a heated workpiece.

16. A high temperature modular electrical resistance heater assembly comprising the combination of:
   an electrically resistive nonmetallic high-temperature heating element having substantially parallel arm members that terminate in an arm joining bridge member at a closed first end region thereof and in energizing conductor reception areas at the opposite open second end region thereof;
   fixedly mounted header means including a plurality of fixed position header elements connected with said high-temperature heating element at said bridge member closed first end region thereof and at said second end region thereof;
   limited movement coupling means disposed between selected of said fixedly mounted header elements and said high-temperature element at one end region thereof for coupling said heater element with said header element in a condition of physical support and heater element thermal expansion movement enablement.

17. The heater assembly of claim 16 wherein said limited movement coupling means includes a first portion fixedly attached to said heater element at said closed first end region thereof and a second portion fixedly attached to the selected adjacent heater element, and wherein said first and second coupling means portions are disposed in single axis relative movement enabling mutual engagement.

18. The heater assembly of claim 17 wherein said heater element is comprised of graphite and further including a plurality of graphite screw elements connecting said heater elements with heater energizing conductors.

19. A high-temperature modular electrical resistance heater assembly comprising the combination of:
   an electrically resistive nonmetallic high-temperature heating element having an elongated U shape with a U leg closing first end region and an open second end region;
   header means including a pair of fluid cooled header elements located adjacent each said resistance element U leg in said open end region for physically supporting said heating element;
   a nonmetallic reradiating member disposed in a plane paralleling the legs of said U-shaped, high-temperature heating element and energizable into an elevated temperature radiating condition by a portion of the energy dissipated in said heating element; and
   a pedestal member located adjacent said header element and supporting said reradiating member in said heating element paralleling position, said pedestal member including a plurality of pressurized cooling fluid conducting manifold apertures of selected differing flow rate capability disposed therein and means connecting with said header elements for conveying pressurized fluid between pedestal member and header elements.

20. The heater assembly of claim 19 wherein said means connecting with said header elements includes a plurality of electrically nonconductive tubing members comprised of heat-resistant organic tubing and disposed in substantially linear axial alignment.

* * * * *

UNITED STATES PATENT AND TRADEMARK OFFICE
CERTIFICATE OF CORRECTION

PATENT NO. : 4,927,994
DATED : May 22, 1990
INVENTOR(S) : Kenneth B. Leger

It is certified that error appears in the above-identified patent and that said Letters Patent is hereby corrected as shown below:

Col 2, line 53, "for" should be ---form---.

Col 3, line 59, "ma" should be ---may---.

Col 7, line 13, "tack" should be ---back---.

Col 7, line 45, "structure" should read ---structure,---.

Col 8, line 2, "238 240, 242, and 244" should read
   ---238, 240, 242, and 244.---.

Col 8, line 3, "preferably" should be ---Preferably---.

Col 8, line 25, "flows coolant" should be ---coolant flows---.

Col 8, line 43, "apparat s" should be ---apparatus---.

Col 8, line 52, ""GLASTHERM TM"" should be
   ---HT "GLASTHERM TM"---.

Col 9, line 45-46, "electrode, members" should be
   ---electrode members,---.

Col 9, line 67, "or" should be ---for---.

Col 10, line 23, "252, 254 234" should be ---252, 254, 234---.

Col 10, line 42, "204" should be ---204.---

UNITED STATES PATENT AND TRADEMARK OFFICE
CERTIFICATE OF CORRECTION

PATENT NO. : 4,927,994

DATED : May 22, 1990

INVENTOR(S) : Kenneth B. Leger

It is certified that error appears in the above-identified patent and that said Letters Patent is hereby corrected as shown below:

```
Col 11, line  1, "St. Marysville. Pa. Grade as" should be
      ---St. Marysville, Pa as Grade---.

Col 11, line 48, after "0.5" should be
      ---inches in thickness.---.

Col 12, line 34, "surface" should be ---surface.---

Col 13, line  2, "c n" should be ---can---.

Col 13, line  3, "oxygen free" should be ---oxygen-free---.
```

Signed and Sealed this

Twenty-ninth Day of October, 1991

Attest:

HARRY F. MANBECK, JR.

*Attesting Officer*  *Commissioner of Patents and Trademarks*